(12) United States Patent
Barkdoll et al.

(10) Patent No.: US 8,499,941 B2
(45) Date of Patent: Aug. 6, 2013

(54) GRAVITY-FED RETAIL DISPLAY HOOK

(75) Inventors: Patrick J. Barkdoll, Pecatonica, IL (US); Thomas E. Valiulis, Rockford, IL (US)

(73) Assignee: Southern Imperial, Inc., Rockford, IL (US)

(*) Notice: Subject to any disclaimer, the term of this patent is extended or adjusted under 35 U.S.C. 154(b) by 179 days.

(21) Appl. No.: 13/152,370

(22) Filed: Jun. 3, 2011

(65) Prior Publication Data
US 2012/0305505 A1 Dec. 6, 2012

(51) Int. Cl.
*A47F 5/08* (2006.01)
(52) U.S. Cl.
USPC .......................................... 211/59.1
(58) Field of Classification Search
USPC .............. 211/57.1, 59.1, 7, 85.31; D8/363, D8/370, 372, 373, 381; 248/220.31, 220.41, 248/220.43, 551, 221.11
See application file for complete search history.

(56) References Cited

U.S. PATENT DOCUMENTS

| 4,246,710 | A | * | 1/1981 | Mixer | 40/651 |
|---|---|---|---|---|---|
| 4,405,051 | A | * | 9/1983 | Thalenfeld | 211/57.1 |
| 4,540,093 | A | * | 9/1985 | Merl et al. | 211/59.1 |
| 4,674,721 | A | * | 6/1987 | Thalenfeld | 248/220.22 |
| 4,805,861 | A | * | 2/1989 | Thalenfeld et al. | 248/221.11 |
| 5,348,167 | A | * | 9/1994 | Jensen | 211/57.1 |
| 5,855,282 | A | * | 1/1999 | Hardy | 211/59.1 |
| 5,860,239 | A | * | 1/1999 | Thalenfeld et al. | 40/642.01 |
| 5,901,487 | A | * | 5/1999 | Thalenfeld et al. | 40/642.01 |
| 6,269,571 | B1 | * | 8/2001 | Thalenfeld | 40/642.01 |
| 6,612,527 | B1 | * | 9/2003 | Nagel | 248/220.43 |
| 6,811,128 | B1 | * | 11/2004 | Wagner et al. | 248/220.31 |
| 7,197,902 | B1 | * | 4/2007 | Barkdoll | 70/57.1 |
| 7,278,617 | B2 | * | 10/2007 | Valiulis et al. | 248/220.31 |
| 7,743,931 | B2 | * | 6/2010 | Barkdoll | 211/7 |
| 7,909,183 | B2 | * | 3/2011 | Oh | 211/59.1 |
| D668,134 | S | * | 10/2012 | Barkdoll et al. | D8/370 |
| 2012/0305505 | A1 | * | 12/2012 | Barkdoll et al. | 211/59.1 |

* cited by examiner

*Primary Examiner* — Jennifer E Novosad
(74) *Attorney, Agent, or Firm* — Reinhart Boerner Van Deuren P.C.

(57) ABSTRACT

A gravity-fed display hook for displaying retail merchandise. The gravity-fed display hook includes a metal wire having first and second bends. The metal wire includes a label-holding wire with a horizontal bar attached at one end, the horizontal bar configured to hold a product label. The metal wire includes a hang wire substantially parallel to the label-holding wire, and a bridge wire connecting the label-holding wire to the hang wire. In an embodiment, the bridge wire is substantially perpendicular to the label-holding and hang wires. A cross wire is attached to the bridge wire and has two bends that form upturned portions configured to fit into openings in a vertical support structure. In an embodiment, the label-holding and hang wires project outwardly from the vertical support structure. The cross wire is configured to position the label-holding and hang wires at a downward angle between 10 and 20 degrees from horizontal.

10 Claims, 4 Drawing Sheets

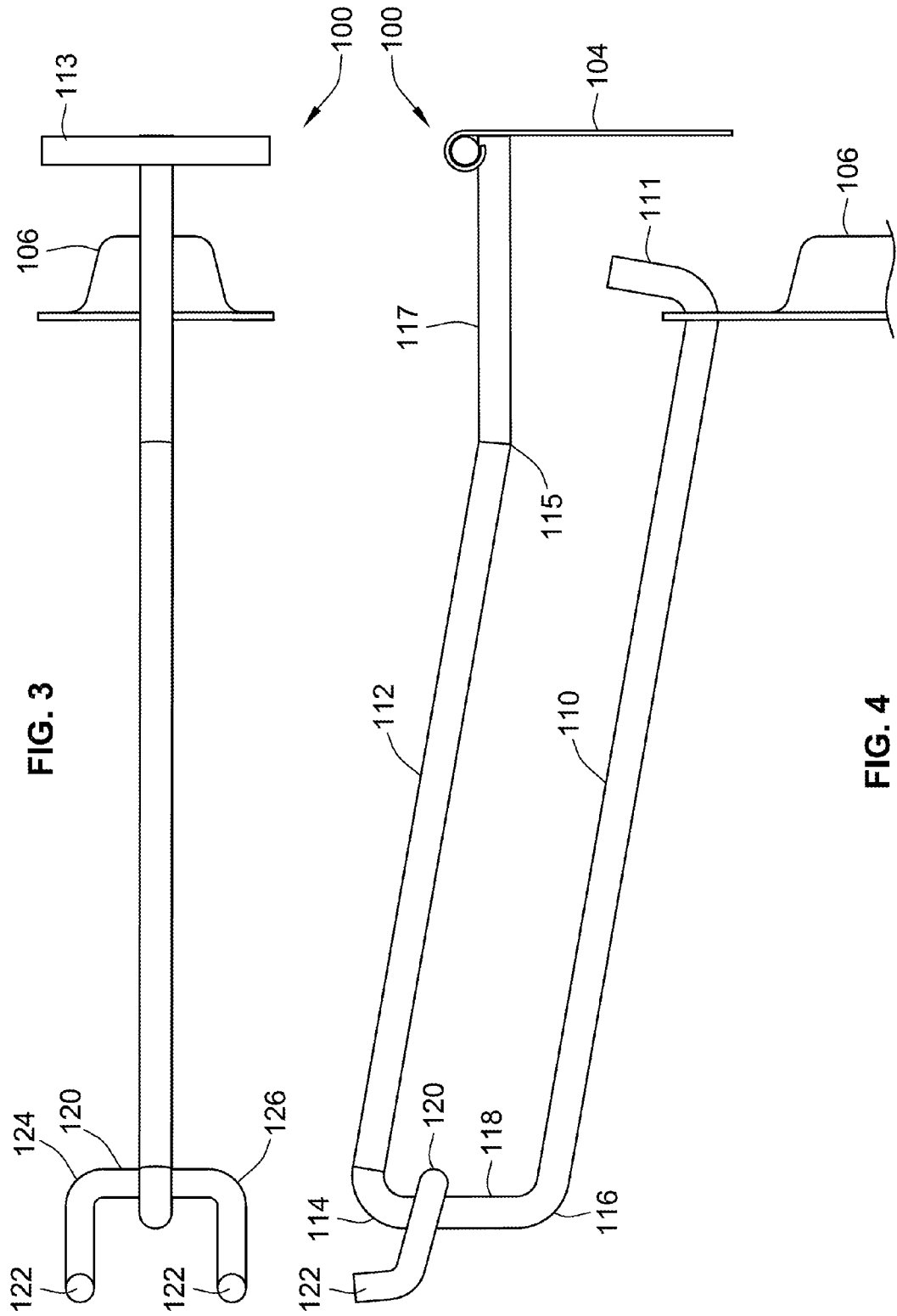

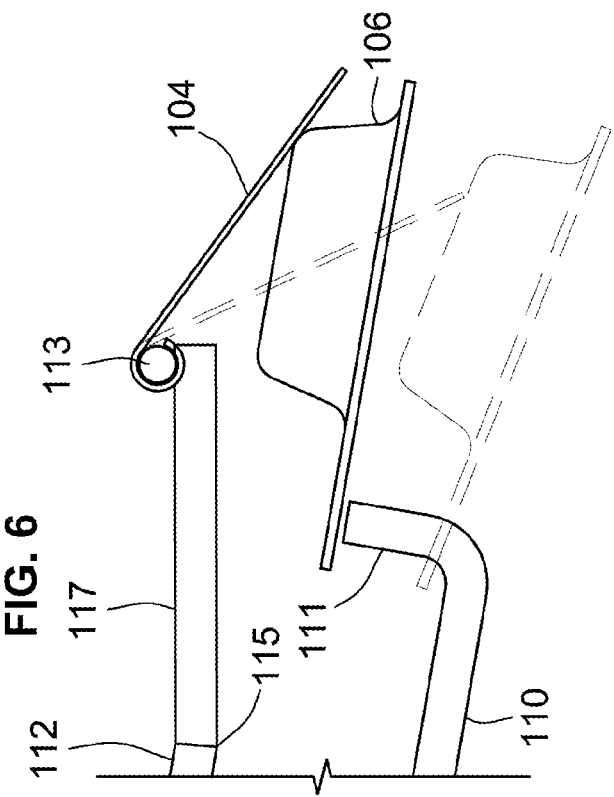
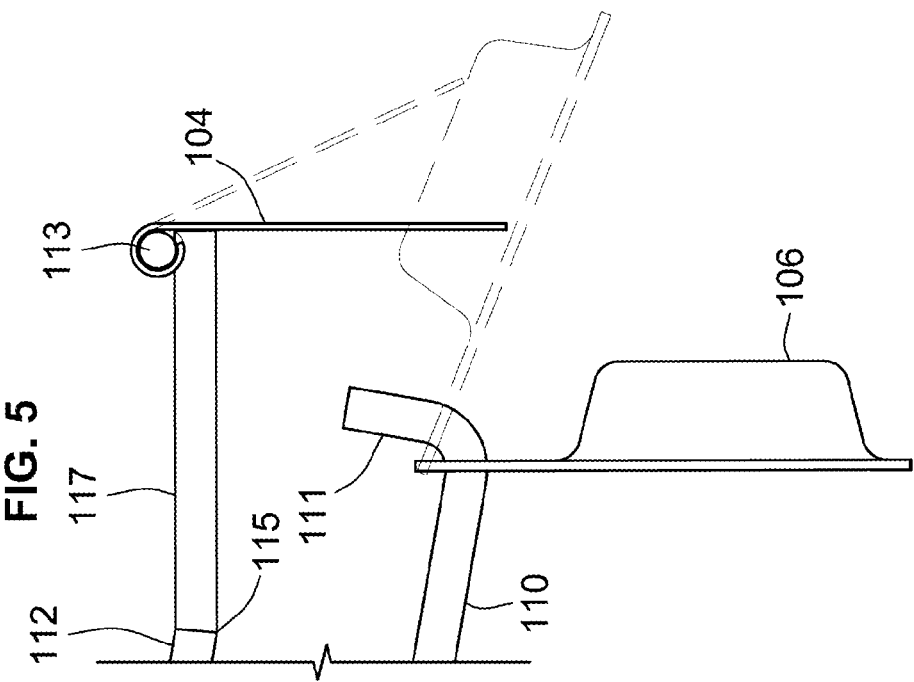

GRAVITY-FED RETAIL DISPLAY HOOK

FIELD OF THE INVENTION

This invention generally relates to a device used for the display of retail goods.

BACKGROUND OF THE INVENTION

In the field of retail display, display assemblies are typically mounted on a vertical support structure for presenting merchandise to the customer. The vertical structure is typically a pegboard, a cross bar, a slat wall support, or wire grid support. Display hooks attach to the vertical support typically by attachment of a back portion of the display hook to the vertical structure. The use of display hooks in retail displays requires careful consideration of the effect the display has on consumers. For example, many display hooks are angled upward causing products on the hook to slide to the back of a product arm. When a product remains at a back of a product arm, the product may not be seen by consumers, resulting in lower sales. Furthermore, consumers may assume that a store is not well stocked if product remains at the rear of a product arm of a display hook. The display can therefore appear empty and not presentable because of the configuration and design of the display hook.

In some retail environments, there is time that is designated for employees to "face" products on the shelves and make the products presentable for the retail store customers. This is not only for appearance but to increase the sales, as the faced items are then seen and not hidden behind the products that are adjacent to the items. Throughout the retail industry, whether the type of display system includes shelves, peg hooks or custom displays, there is a need for facing the retail products so as to properly present the merchandise to the customer.

It would therefore be desirable to have a retail display hook that allows for merchandise to be properly faced for display to the customer, and which requires little or no facing of retail items by retail employees. Embodiments of the invention provide such a retail display hook. These and other advantages of the invention, as well as additional inventive features, will be apparent from the description of the invention provided herein.

BRIEF SUMMARY OF THE INVENTION

In one aspect, embodiments of the invention provide a gravity-fed display hook for displaying retail merchandise. The gravity-fed display hook includes a metal wire having a first bend and a second bend. Further, the metal wire includes a label-holding wire with a horizontal bar attached at one end, the horizontal bar configured for mounting of a flip scan label holder. In particular embodiments of the invention, the metal wire also includes a hang wire substantially parallel to the label-holding wire, and a bridge wire that connects the label-holding wire to the hang wire. In an embodiment, the bridge wire is substantially perpendicular to the label-holding wire and hang wire. A cross wire is attached to the bridge wire. The cross wire has two bends that form upturned portions configured to fit into openings in a vertical support structure. In an embodiment, the label-holding and hang wires project outwardly from the vertical support structure. The cross wire is further configured to position the label-holding and hang wires at an angle between 10 and 20 degrees downward from horizontal.

In a particular embodiment of the invention, the angle of the two bends in the cross wire are each between 105 and 110 degrees, the angle of the first and second bends are each between 88 and 92 degrees, and the cross wire is configured to position the label-holding and hang wires at an angle between 13 and 17 degrees downward from horizontal when the cross wire is inserted into the vertical support structure.

In a further embodiment of the invention, the cross wire is generally U-shaped and attached to the bridge wire by welding. Further, the horizontal bar is attached to the label-holding wire by welding. In a more particular embodiment, the label-holding wire includes an upward bend such that the label-holding wire includes a downward-extending portion and an end portion that is within three degrees of horizontal.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 3 is a top view of the gravity-fed retail display hook of FIG. 1;

FIG. 4 is a side view of the gravity-fed retail display hook of FIG. 1;

FIG. 5 is a is side view of an end portion of the gravity-fed retail display hook of FIG. 1 showing how a flip scan label holder moves when a retail item is pivoted upward; and FIG. 6 is a is side view of an end portion of the gravity-fed retail display hook of FIG. 1 showing how the flip scan label holder moves when a retail item is removed from the hang wire.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In conventional designs for a scan-style hook, the hang wire and the label-holding wire typically run parallel to each other in an upward fashion from the peg board at a 3 to 10 degree angle, for example, based on the specific design of the hook. With a gravity-fed design, rather than the hang wire and label wire being made to have an upward angle, there is a downward angle which allows the product on the hook to slide forward. Generally, there is an added upturn at the end of the hook to cause the product to stop so as not to slide off of the hook. Ordinarily, the downward angle is needed to properly face the product, however the design is typically made to keep the downward angle at a minimum.

Figure 1:
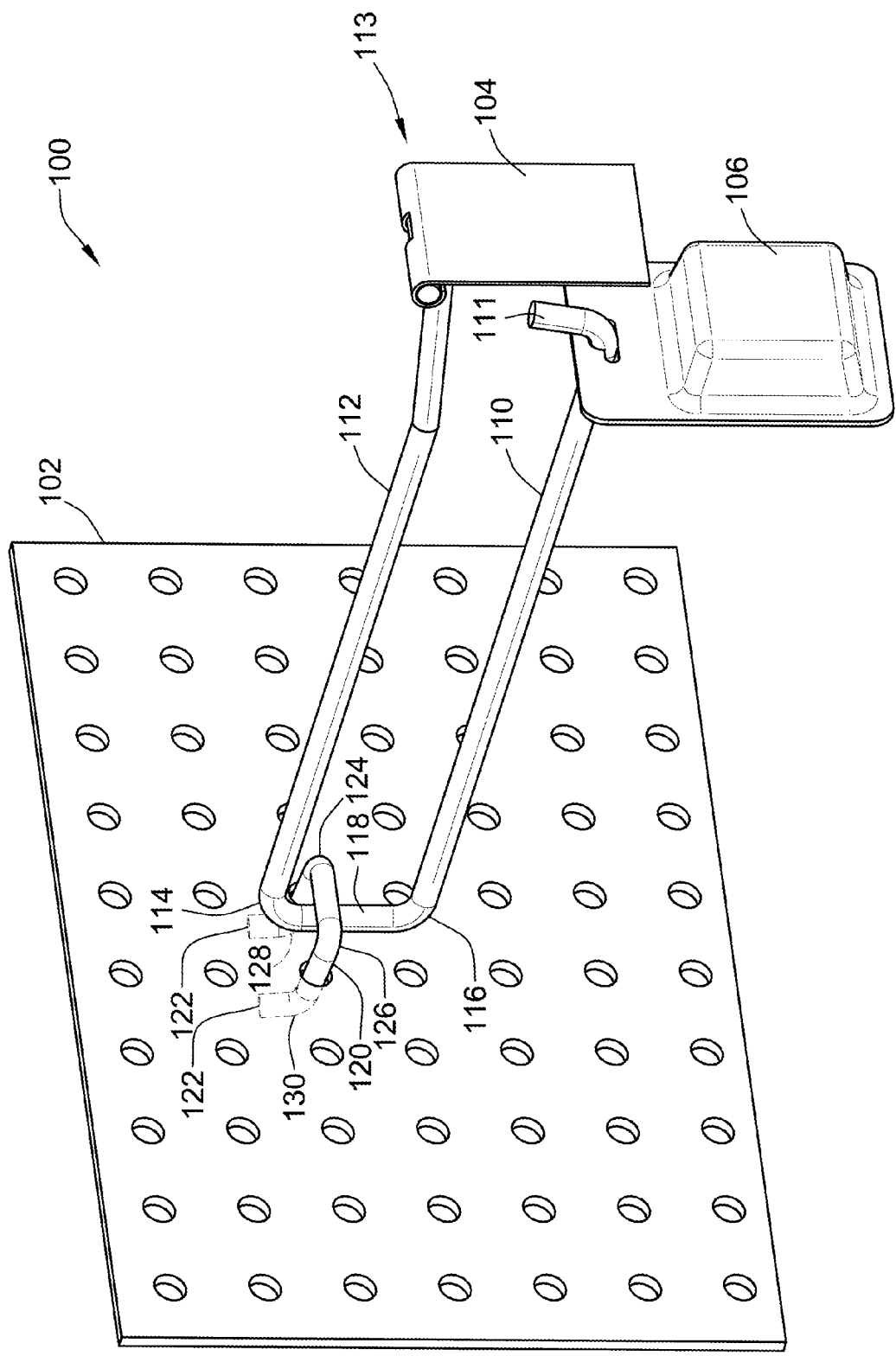
FIG. 1 is a perspective view of a gravity-fed retail display hook shown inserted in a peg board and including an exemplary flip scan label holder and exemplary retail item, the gravity-fed retail display hook constructed in accordance with an embodiment of the invention.
Figure 2:
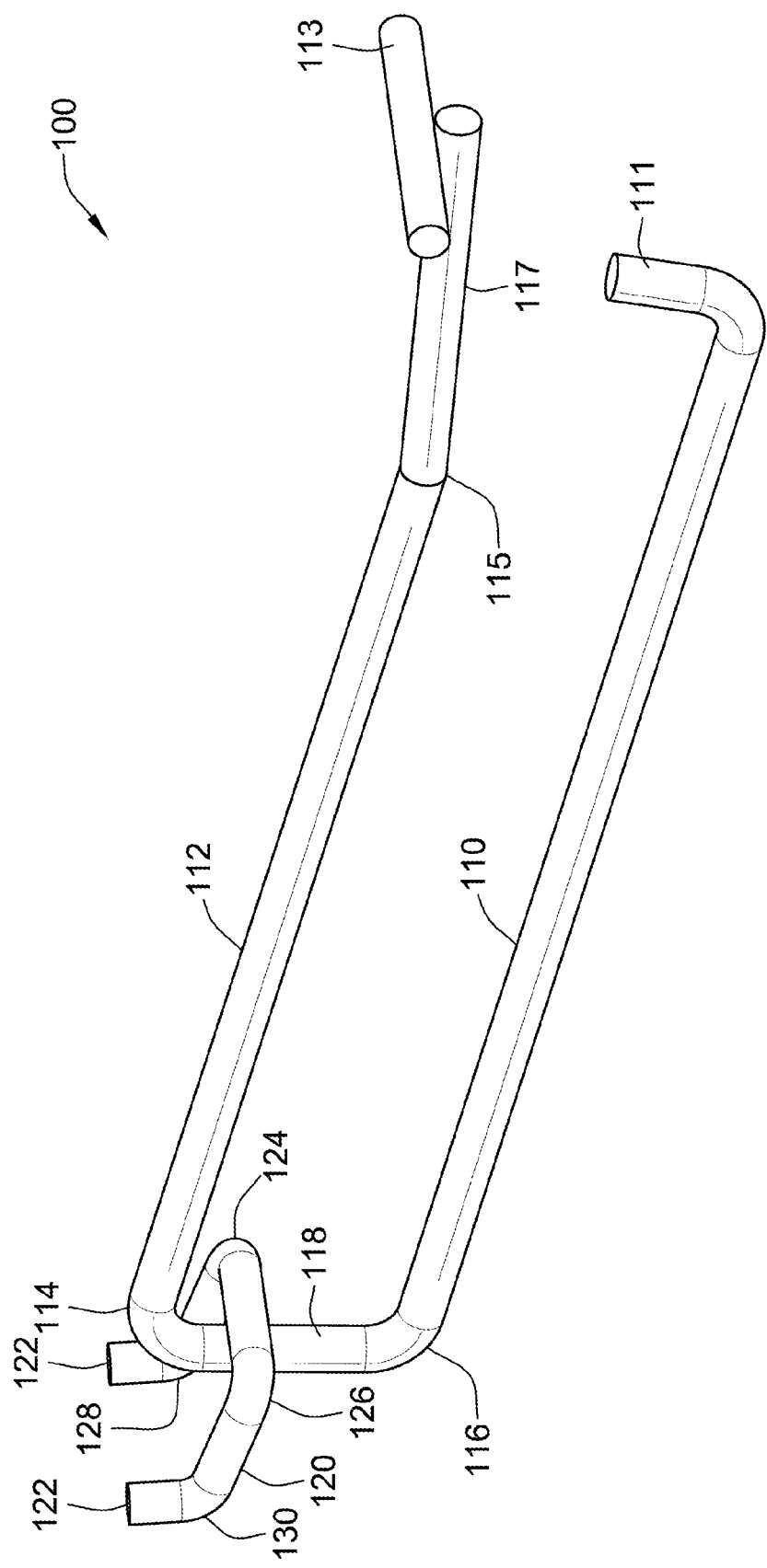
FIG. 2 is a perspective view of the gravity-fed retail display hook of FIG. 1 without exemplary flip scan label holder and retail item.

FIGS. 1-6 show several different views of a gravity-fed retail display hook 100, constructed in accordance with an embodiment of the invention. FIGS. 1 and 2 are perspective views of a gravity-fed retail display hook 100, according to an embodiment of the invention, while FIGS. 3 and 4 show top and side views, respectively, of retail display hook 100. FIGS. 5 and 6 show the interaction between an exemplary flip scan label holder 104 and an exemplary retail item 106, according to an embodiment of the invention. In an embodiment of the present invention, the retail display hook 100 is designed to hang at an approximately 15-degree downward angle. Generally, in embodiments of the invention, this downward angle may be from 10 to 20 degrees. In particular embodiments, this downward angle may be from 13 to 17 degrees.

In FIG. 1, the gravity-fed retail display hook 100 is shown inserted in a peg board 102 and including the exemplary flip scan label holder 104 and exemplary retail item 106. A hang wire 110 and a label-holding wire 112 run parallel to each other. projecting away from the peg board 102. The two segments (i.e., the hang wire 110 and the label-holding wire 112) are part of a continuous wire. There are two bends 114, 116 at the points where the hang wire 110 and the label-holding wire 112 segments converge with a bridge wire 118. These two bends 114, 116 have combined angles that are approximately equal to 180 degrees. More specifically, in particular embodiments, each bend 114, 116 is between 88 and 92 degrees.

The bridge wire 118 that runs between the hang wire 110 and label-holding wire 112 and the length of the bridge wire 118 determines the distance between the hang wire 110 and the label-holding wire 112. The hang wire 110 has an upturned portion 111 at one end to prevent merchandise, such as exemplary retail item 106, from sliding off of the hang wire 110. In a particular embodiment, there is a horizontal bar 113 attached at an end of the label-holding wire 112. The horizontal bar 113 is for mounting of the flip scan label holder 104. In a particular embodiment of the invention illustrated in FIGS. 2 and 4, the label-holding wire 112 includes an upward bend 115 that creates a relatively horizontal portion 117 of the label-holding wire 112. In a particular embodiment, the relatively horizontal portion 117 is within three degrees of horizontal. This places the flip scan label holder (and accompanying label) in a better position for viewing by the customer, and creates additional separation between the ends of the hang wire 110 and label-holding wire 112, which makes removing product from the hang wire 110 easier.

In an embodiment of the gravity-fed retail display hook 100, the horizontal bar 113 is welded to the outward end of the label-holding wire 112. This horizontal bar 113 can be attached in one of two locations. The first location is where the horizontal bar 113 is set back so that the end of the label-holding wire 112 protrudes forward and creates a resting area for the flip scan label holder 104. The second location is where the horizontal bar 113 is welded flush to, or slightly in front of, the end of the label-holding wire 112. The label-holding wire 112 then has an upward bend at a short distance forward of the horizontal bar 113 to adjust for the hanging angle of the flip scan label holder 104.

There is a cross wire 120 with a series of bends that is attached to the bridge wire 118 that runs between the hang wire 110 and the label-holding wire 112. In a particular embodiment, this cross wire 120 is welded to the bridge wire 118. The purpose of the cross wire 120 is to provide the pegs 122 or upturned areas that mount into the peg board 102 or some similar vertical support structure. The distance that the cross wire 120 protrudes from the peg board 102 will create the hang angle of the label holder. In a particular embodiment, the cross wire 120 includes two bends 124, 126 such that the cross wire 120 is substantially U-shaped.

Two other bends 128, 130 closer to the ends of the cross wire 120 create the upturned pegs 122 that are inserted into the peg board 102. In some conventional retail display hooks, the bends which create these pegs are made at a roughly 90-degree intersection between the two wires. However, in embodiments of the gravity-fed retail display hook 100, this bend angle has an approximately 107-degree intersection to create pegs 122. In a particular embodiment, the bend angle that creates the pegs 122 is between 105 and 110 degrees. Thus, the gravity-fed retail display hook 100 can be manufactured by the same type of machines used to manufacture conventional style hooks product without creating new tooling for the machine to manufacture the gravity-fed retail display hook 100.

FIGS. 5 and 6 show side views of an end portion of the gravity-fed retail display hook 100 of FIG. 1, showing how the flip scan label holder 104 moves when the retail item 106 is pivoted upward and removed from the hang wire 110. As can be seen from FIGS. 5 and 6, the hang wire 110 and label-holding wire 112 are spaced such that removal of the retail item 106 from the hang wire 110 causes contact with the flip scan label holder 104 such that the flip scan label holder is pivoted upward and out of the way to facilitate removal of the retail items such as exemplary retail item 106.

Thus, it can be seen that the cross wire 120 and the bend angle of positioning of the gravity-fed retail display hook 100 in a peg board (such as peg board 102) or similar vertical support structure allows for product flow along the hang wire 110 from back to front as retail items (such as exemplary retail item 106) are removed from the hang wire 110. As such, the retail items are properly faced with little or no maintenance of the display required. Further, product labels placed in flip scan label holder 104 are positioned for easy viewing by the customer while causing minimal interference as retail items are removed from the hang wire 110.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A gravity-fed display hook for displaying retail merchandise, the gravity-fed display hook comprising:
   a metal wire having a first bend and a second bend and further comprising:
      a label-holding wire with a horizontal bar attached at one end, the horizontal bar configured for mounting of a flip scan label holder thereto;
      a hang wire substantially parallel to the label-holding wire; and
      a bridge wire that connects the label-holding wire to the hang wire, the bridge wire being substantially perpendicular to the label-holding wire and hang wire;
   a cross wire attached to the bridge wire, the cross wire having two bends that form upturned portions configured to fit into openings in a vertical support structure such that the label-holding and hang wires project outwardly from the vertical support structure, the cross wire further configured to position the label-holding and hang wires at a downward angle between 10 and 20 degrees from horizontal;
   wherein the label-holding wire includes an upward bend such that the label-holding wire includes a downward-extending portion and an end portion that is within three degrees of horizontal.

2. The gravity-fed display hook of claim 1, wherein the angle of the two bends in the cross wire are each between 105 and 110 degrees.

3. The gravity-fed display hook of claim 1, wherein the angle of the first and second bends are each between 88 and 92 degrees.

4. The gravity-fed display hook of claim 1, wherein the cross wire is configured to position the label-holding and hang wires at an angle between 13 and 17 degrees downward from horizontal when the cross wire is inserted into the vertical support structure.

5. The gravity-fed display hook of claim 1, wherein the horizontal bar is attached to an end of the label-holding wire by welding.

6. The gravity-fed display hook of claim 5, wherein the horizontal bar is welded flush to, or slightly in front of, the end of the label-holding wire.

7. The gravity-fed display hook of claim 5, wherein the horizontal bar is welded so that the end of the label-holding wire protrudes forward of the horizontal bar and creates a resting area for the flip scan label holder.

8. The gravity-fed display hook of claim 1, wherein the hang wire includes an upturned portion to prevent retail items on the hang wire from sliding off the end of the hang wire.

9. The gravity-fed display hook of claim 1, wherein the cross wire is attached to the bridge wire by welding.

10. The gravity-fed display hook of claim 1, wherein the cross wire is U-shaped.

* * * * *